United States Patent
Yokoyama

(10) Patent No.: US 9,534,662 B2
(45) Date of Patent: Jan. 3, 2017

(54) CHAIN

(71) Applicant: TSUBAKIMOTO CHAIN CO., Osaka-shi, Osaka (JP)

(72) Inventor: Masanori Yokoyama, Osaka (JP)

(73) Assignee: TSUBAKIMOTO CHAIN CO., Osaka-shi (JP)

( * ) Notice: Subject to any disclaimer, the term of this patent is extended or adjusted under 35 U.S.C. 154(b) by 0 days.

(21) Appl. No.: 14/887,904

(22) Filed: Oct. 20, 2015

(65) Prior Publication Data
US 2016/0116022 A1 Apr. 28, 2016

(30) Foreign Application Priority Data
Oct. 22, 2014 (JP) ................. 2014-215531

(51) Int. Cl.
| F16G 13/06 | (2006.01) |
| F16G 13/07 | (2006.01) |
| F16G 13/02 | (2006.01) |
| F16G 13/08 | (2006.01) |
| F16G 13/04 | (2006.01) |
| F16H 7/06 | (2006.01) |

(52) U.S. Cl.
CPC ............... *F16G 13/07* (2013.01); *F16G 13/02* (2013.01); *F16G 13/04* (2013.01); *F16G 13/06* (2013.01); *F16G 13/08* (2013.01); *F16H 7/06* (2013.01)

(58) Field of Classification Search
CPC .......... F16G 13/07; F16G 13/02; F16G 13/04; F16G 13/06; F16G 13/08; F16H 7/06
USPC ........................................... 59/4, 5, 84
See application file for complete search history.

(56) References Cited

U.S. PATENT DOCUMENTS

| 2,498,788 | A | * | 2/1950 | Bremer | F16G 13/06 474/228 |
| 4,265,134 | A | * | 5/1981 | Dupoyet | F16G 13/06 474/231 |
| 8,801,554 | B2 | * | 8/2014 | Miyazawa | F16G 13/06 474/230 |
| 9,109,657 | B2 | * | 8/2015 | Bodensteiner | F16G 13/02 |
| 2002/0132690 | A1 | * | 9/2002 | Suzuki | F16G 13/04 474/212 |
| 2007/0082776 | A1 | | 4/2007 | Nagao | |
| 2012/0316020 | A1 | | 12/2012 | Miyazawa | |
| 2016/0116022 | A1 | * | 4/2016 | Yokoyama | F16G 13/07 59/84 |

FOREIGN PATENT DOCUMENTS

| JP | 2007-107583 A | 4/2007 |
| JP | 2012-255523 A | 12/2012 |

* cited by examiner

*Primary Examiner* — David B Jones
(74) *Attorney, Agent, or Firm* — Westerman, Hattori, Daniels & Adrian, LLP

(57) ABSTRACT

An object of the present invention is to provide a chain that employs simple structures so as to establish contact surface pressures in accordance with various conditions of use, for the purpose of reducing frictional loss and preventing wear or damage to a chain guide member, as well as reducing order-related noise. The chain 100 is formed by inner links 101 and outer links 102 alternately and pivotably coupled together in a longitudinal direction of the chain. The plurality of inner plates 110 include an asymmetrical inner plate 110x having different edge shapes on upper and lower sides in a height direction of the chain.

2 Claims, 3 Drawing Sheets

CHAIN

BACKGROUND OF THE INVENTION

1. Field of the Invention

The present invention relates to a chain having a plurality of inner links having a plurality of inner plates in a width direction of the chain, and a plurality of outer links having a plurality of outer plates in the width direction of the chain, these inner and outer links being alternately and pivotably coupled together in the longitudinal direction of the chain.

2. Description of the Related Art

Bushing chains and roller chains and the like used in chain transmission mechanisms are known, which include a plurality of inner links having a plurality of inner plates in a width direction of the chain, and a plurality of outer links having a plurality of outer plates in the width direction of the chain, these inner and outer links being alternately and pivotably coupled together in the longitudinal direction of the chain. Chain transmission mechanisms having a chain guide member that makes sliding contact with the chain between sprockets are also known.

Generally, the outer plates and inner plates of bushing chains, roller chains and the like are both oval-shaped. These outer plates or inner plates make sliding contact with the chain guide member along the edges at one end in the height direction.

For example, in a known chain such as a chain shown in Japanese Patent Application Laid-open No. 2007-107583, inner plates (inner link plates 5) are larger in the height direction than the outer plates (outer link plates 2) so that only the inner plates (inner link plates 5) make sliding contact with the chain guide member, as a result of which the overall contact area in the chain is made smaller and frictional loss is reduced.

In the known chain such as the one shown in Japanese Patent Application Laid-open No. 2012-255523, inner plates (inner link plates 112) are formed elliptical to protrude outward at the center in the longitudinal direction of the chain so as to further reduce the area where they make sliding contact with the chain guide member, as a result of which the overall contact area in the chain is made smaller and frictional loss is reduced.

SUMMARY OF THE INVENTION

In these known chains, while frictional loss is reduced, the contact surface pressure between the chain and the chain guide member is increased in proportion to the reduction in contact area. Therefore, depending on the condition of use, for example, when the chain tension is large, the smaller contact area was sometimes not beneficial when it comes to prevention of wear or damage of the chain guide member.

Another problem was that contact noise with a constant frequency was generated when the running chain entered into the chain guide member due to the equally spaced inner plates making contact with the chain guide member intermittently. Such constant frequency noise could sometimes increase the level of order-related noise and cause large audible noise.

The present invention solves these problems and it is an object of the invention is to provide a chain that employs simple structures so as to establish contact surface pressures in accordance with various conditions of use, for the purpose of reducing frictional loss and preventing wear or damage to a chain guide member, as well as reducing order-related noise.

The chain according to the present invention is a chain including a plurality of inner links having a plurality of inner plates in a width direction of the chain, and a plurality of outer links having a plurality of outer plates in the width direction of the chain, the plurality of inner links and outer links being alternately and pivotably coupled together in a longitudinal direction of the chain, wherein the plurality of inner plates include an asymmetrical inner plate having different edge shapes on upper and lower sides in a height direction of the chain.

According to the chain set forth in a first example, the plurality of inner plates include an asymmetrical inner plate having different edge shapes on upper and lower sides in the chain height direction, so that, by being mounted to a chain transmission mechanism upside down, the chain allows for selection of different contact area and contact surface pressure between the chain and the chain guide member.

This way, a single chain can offer a better option in regard to frictional loss, wear or damage of the chain guide member, and order-related noise in accordance with the condition of use, and thus the chain can have higher versatility.

According to the chain set forth in a second example, a plurality of asymmetrical inner plates include a plate that has any two of three or more different edge shapes on upper and lower sides. This way, the edge shapes of the asymmetrical inner plates that make sliding contact with the chain guide member can be arranged randomly in the longitudinal direction of the chain, whereby the order-related noise can be reduced further.

According to the chain set forth in a third example, the inner links include asymmetrical inner plates having different edge shapes in a width direction of the chain. This way, the timing of contact between one inner link and the chain guide member can be differed between the left and right plates, whereby the order-related noise can be reduced further.

According to the chain set forth in a fourth example, different edge shapes are arranged randomly at least in one of the width direction of the chain, longitudinal direction of the chain, and a vertical direction. This way, the chain components make contact with the chain guide member randomly as a whole, whereby the order-related noise can be reduced further.

DESCRIPTION OF THE PREFERRED EMBODIMENTS

The chain according to the present invention may be embodied in any specific form as long as it includes a plurality of inner links having a plurality of inner plates in a width direction of the chain, and a plurality of outer links having a plurality of outer plates in the width direction of the chain, these inner and outer links being alternately and pivotably coupled together in the longitudinal direction of the chain, wherein the plurality of inner plates include an asymmetrical inner plate having different edge shapes on upper and lower sides in a height direction of the chain, whereby the object of the present invention is to provide a chain that employs simple structures so as to establish contact surface pressures in accordance with various conditions of use, for the purpose of reducing frictional loss and preventing wear or damage to a chain guide member, as well as reducing order-related noise.

Figure 1:
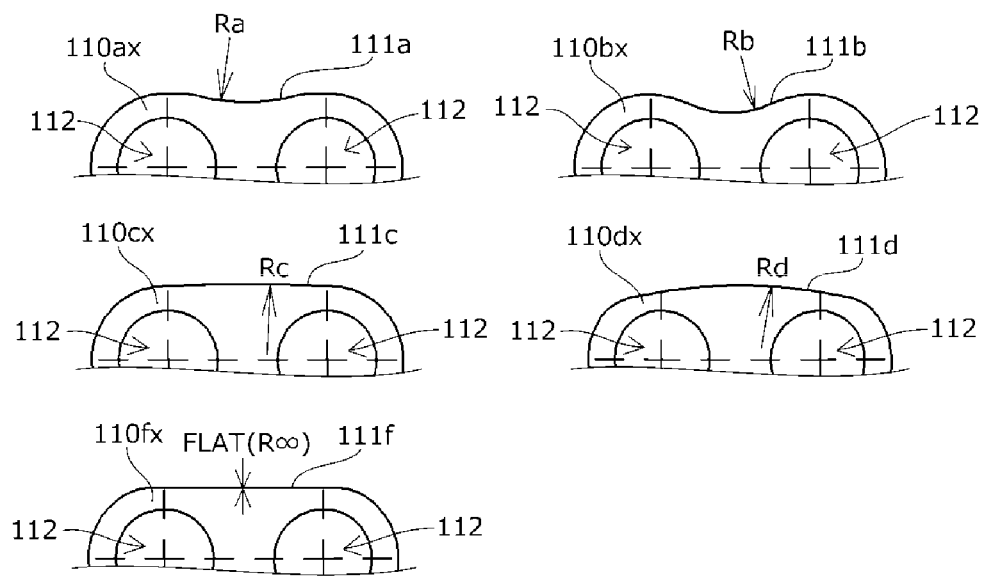
FIG. 1 is a diagram for explaining the edge shapes of the inner plates in the chain according to the present invention.

There can be five types of edge shapes on upper and lower sides in the height direction of the chain such as those shown in FIG. 1, for example.

The upper edge 111a in the chain height direction of the asymmetrical inner plate 110ax is curved inward in a center part in the longitudinal direction with a radius of curvature Ra in side view. The upper edge 111b in the chain height direction of the asymmetrical inner plate 110bx is curved inward in a center part in the longitudinal direction with a radius of curvature Rb in side view.

The radius of curvature Ra is larger than Rb (Ra>Rb). The upper edge 111c in the chain height direction of the asymmetrical inner plate 110cx is curved outward in a center part in the longitudinal direction with a radius of curvature Rc in side view. The upper edge 111d in the chain height direction of the asymmetrical inner plate 110dx is curved outward in a center part in the longitudinal direction with a radius of curvature Rd in side view.

The radius of curvature Rc is larger than Rd (Rc>Rd).

The upper edge 111f in the chain height direction of the asymmetrical inner plate 110fx is straight in a center part in the longitudinal direction (with the radius of curvature R∞ being infinite) in side view.

Two of these edge shapes 111 may be selected so that the asymmetrical inner plates 110yx have different edge shapes on upper and lower sides.

(The asymmetrical inner plate is denoted by "110ac", for example, when it has an edge 111a on the upper side and an edge 111c on the lower side).

Embodiment 1

Figure 2:
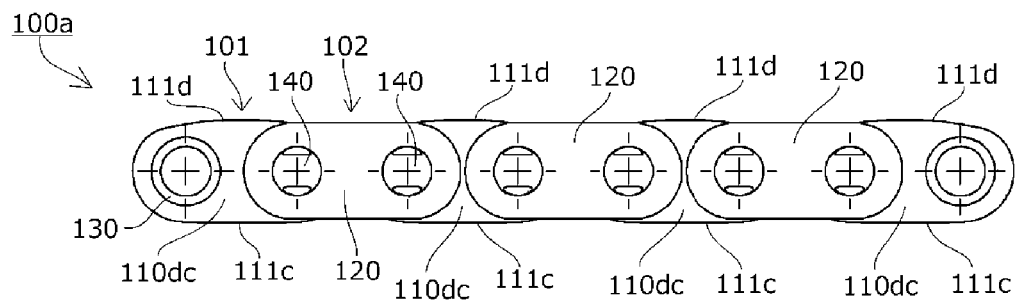
FIG. 2 is a side view of the chain according to a first embodiment of the present invention.

The chain 100a according to a first embodiment of the present invention is formed by inner links 101 and outer links 102 alternately and pivotably coupled together in the longitudinal direction of the chain by bushings 130 and pins 140 as shown in FIG. 2.

Asymmetrical inner plates 110dc are used for all the inner links 101, and these asymmetrical inner plates 110dc are oriented the same in the up and down direction so that they have the edge 111d on the upper side and the edge 111c on the lower side.

When this chain 100a is mounted to a chain transmission mechanism upside down, the chain can have different contact area and contact surface pressure between the chain and the chain guide member, and this way the chain offers a better option in regard to frictional loss and the wear or damage of the chain guide member in accordance with the condition of use.

Embodiment 2

Figure 3:
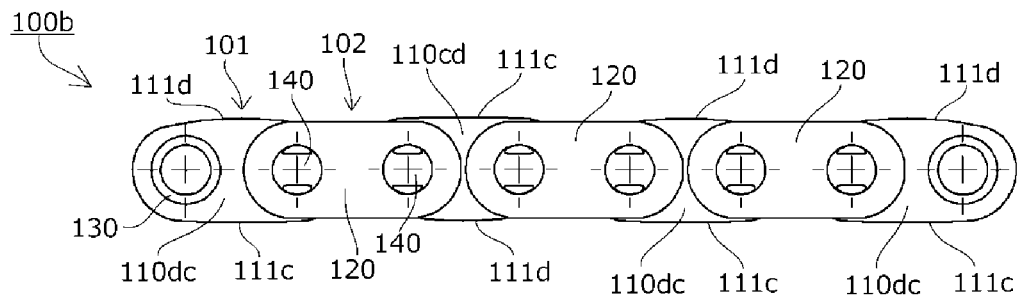
FIG. 3 is a side view of the chain according to a second embodiment of the present invention.

The chain 100b according to a second embodiment of the present invention uses asymmetrical inner plates 110dc in all of the inner links 101 as shown in FIG. 3. The asymmetrical inner plates 110dc and 110cd are arranged such that they have the edge 111d and edge 111c on the upper and lower sides in a random order in the running direction of the chain 100b.

This chain 100b can be mounted to a chain transmission mechanism upside down so that the contact area and contact surface pressure between the chain and the chain guide member vary randomly, whereby the order-related noise can be reduced.

The plates can be arranged such that the ratio of the edge 111d to the edge 111c differs between the upper side and the lower side. By mounting the chain upside down, different contact area and contact surface pressure between the chain and the chain guide member can be selected, and this way, the chain offers a better option in regard to the frictional loss and the wear or damage of the chain guide member in accordance with the condition of use.

While one example was shown in both first and second embodiments in which asymmetrical inner plates 110dc and 110c that have the edge 111d and edge 111c either on the upper side or lower side are used, the asymmetrical inner plates each having edges of different shapes including those of the edges 111a, 111b, and 111f shown in FIG. 1 may also be used, or, asymmetrical inner plates each having edges other than those shown in FIG. 1 can also be used.

Embodiment 3

The chain 100c according to a third embodiment of the present invention is formed by various types of inner links 101x connected such that they are arranged randomly in the longitudinal direction of the chain not only in terms of type but also in their up-and-down orientation.

The inner links 101x are formed by multiple types of asymmetrical inner plates 110yx having two different edge shapes selected from various edge shapes, and they are aligned in a randomly selected order in randomly selected up-and-down orientation.

Figure 4:
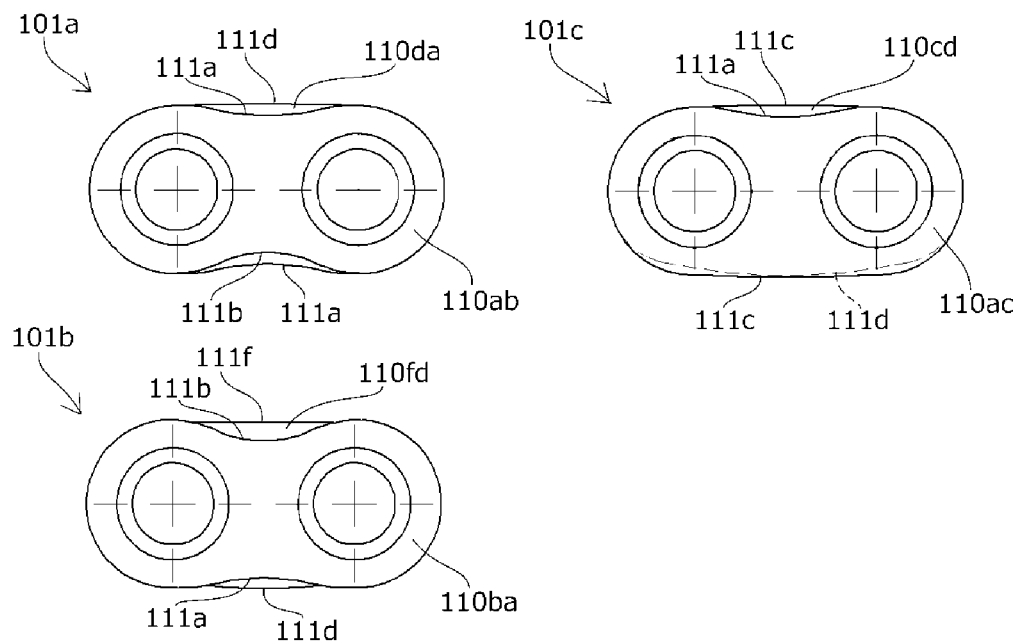
FIG. 4 is a side view of the inner link of the chain according to a third embodiment of the present invention.

The inner link 101x may be an inner link 101a, for example, as shown in FIG. 4, which is formed by a combination of an asymmetrical inner plate 110ab and an asymmetrical inner plate 110da, or an inner link 101b that is formed by a combination of an asymmetrical inner plate 110ba and an asymmetrical inner plate 110fd, or an inner link 101c that is formed by a combination of an asymmetrical inner plate 110ac and an asymmetrical inner plate 110cd.

Many other types of inner links 101x can be prepared in accordance with available edge shapes.

Figure 5:
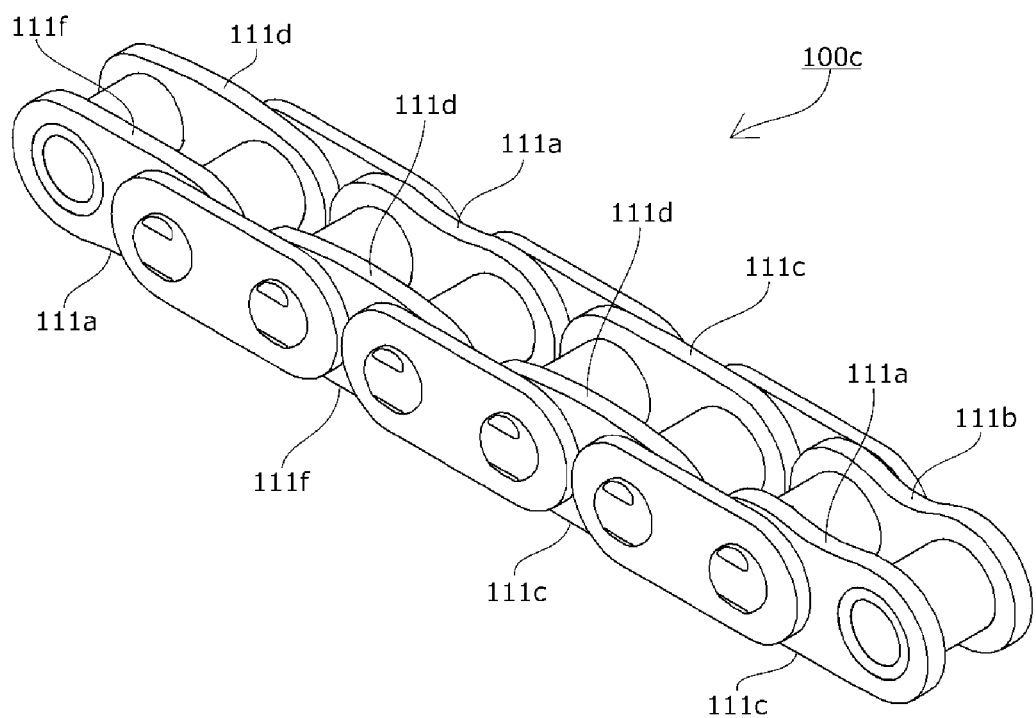
FIG. 5 is a perspective view of the chain according to the third embodiment of the present invention.

The chain 100c constituted as thus explained has asymmetrical inner plates 110 with different edge shapes randomly arranged in all of the chain running direction, width direction, and up and down direction as shown in FIG. 5, so that the overall timing of contact between the chain components and the chain guide member is made random, whereby the order-related noise can be reduced further.

While specific examples of chains according to the present invention have been shown in the embodiments described above, the invention is not limited to these. As long as the chain includes an asymmetrical inner plate having different edge shapes on the upper and lower sides in the chain height direction, the chain may include inner plates that are not asymmetrical. For instance, the specific shapes, positions, dimensions, and arrangement relative to each other of various components such as the inner plates, outer plates, bushings, pins and others can be variously modified.

The chain may have other constituent elements than the inner plates, outer plates, bushings, and pins.

What is claimed is:

1. A chain comprising: a plurality of inner links having a plurality of inner plates in a width direction of the chain, and a plurality of outer links having a plurality of outer plates in the width direction of the chain, the plurality of inner links and the plurality of outer links being alternately and pivotably coupled together in a longitudinal direction of the chain, wherein
the plurality of inner plates include a plurality of asymmetrical inner plates having different edge shapes on upper and lower sides in a height direction of the chain,
the plurality of asymmetrical inner plates include plates that have two different edge shapes on upper and lower sides that are selected from three or more different edge shapes,
the inner links include asymmetrical inner plates having different edge shapes in a width direction of the chain, and
the different edge shapes are arranged randomly at least in one of a width direction of the chain, a longitudinal direction of the chain, and a vertical direction.

2. A chain comprising: a plurality of inner links having a plurality of inner plates in a width direction of the chain, and a plurality of outer links having a plurality of outer plates in the width direction of the chain, the plurality of inner links and the plurality of outer links being alternately and pivotably coupled together in a longitudinal direction of the chain, wherein
the plurality of inner plates include an asymmetrical inner plate having different edge shapes on upper and lower sides in a height direction of the chain, and
the different edge shapes are arranged randomly at least in one of a width direction of the chain, a longitudinal direction of the chain, and a vertical direction.

* * * * *